United States Patent [19]

Kanamaru et al.

[11] 4,335,496
[45] Jun. 22, 1982

[54] METHOD OF COUPLING TWO CONCENTRICALLY DISPOSED MEMBERS

[75] Inventors: Hisanobu Kanamaru; Akira Tohkairin, both of Katsuta; Hideo Tatsumi, Mito; Moisei Okabe, Hitachi, all of Japan

[73] Assignee: Hitachi, Ltd., Tokyo, Japan

[21] Appl. No.: 187,852

[22] PCT Filed: Feb. 19, 1979

[86] PCT No.: PCT/JP79/00037
§ 371 Date: Oct. 22, 1979
§ 102(e) Date: Oct. 22, 1979

[87] PCT Pub. No.: WO79/00711
PCT Pub. Date: Oct. 4, 1979

[30] Foreign Application Priority Data

Feb. 20, 1978 [JP] Japan .................................. 53-17647
Mar. 29, 1978 [JP] Japan .................................. 53-37251

[51] Int. Cl.³ .................... B21D 39/00; B23P 11/00
[52] U.S. Cl. .................................. 29/520; 29/418; 29/522 R; 403/274
[58] Field of Search ................ 29/520, 521, 522 R, 29/418; 403/274

[56] References Cited

U.S. PATENT DOCUMENTS

| 2,038,124 | 4/1936 | Osborne | 29/520 UX |
| 2,313,312 | 3/1943 | Bakewell | 29/520 UX |
| 2,804,679 | 9/1957 | Tracy | 29/522 R X |
| 2,934,815 | 5/1960 | Stumbock | 29/418 X |
| 3,559,946 | 2/1971 | Baxter | 29/521 X |
| 3,641,865 | 2/1972 | Swindt | 29/523 X |

Primary Examiner—Charlie T. Moon
Attorney, Agent, or Firm—Craig and Antonelli

[57] ABSTRACT

A coupling process of two metallic members in which a first member to-be-coupled and a second member to-be-coupled are coupled by non-elastically deforming a coupling member. The steps comprise forming a concave portion having an inclined plane on a coupling face of each member to-be-coupled, arranging the members to-be-coupled to make a space therebetween, interposing the coupling member in the space, and applying pressure on the coupling member by using a metal mould to satisfy the following extent:

$$0 \leq S \leq b\tfrac{1}{3}b$$

wherein S is the length of rubbing surface of the members to-be-coupled with the coupling member, and b is the distance between the first and second members to-be-coupled.

15 Claims, 30 Drawing Figures (A)

(B)

(C)

(D)

FIG. 22
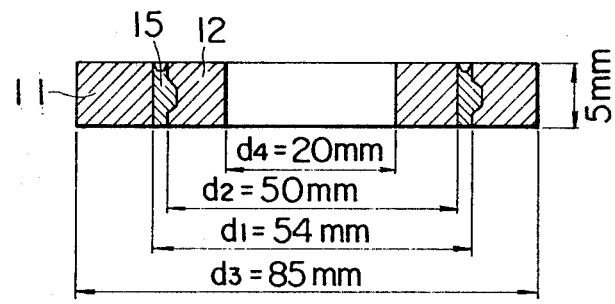
FIG. 23
FIG. 24
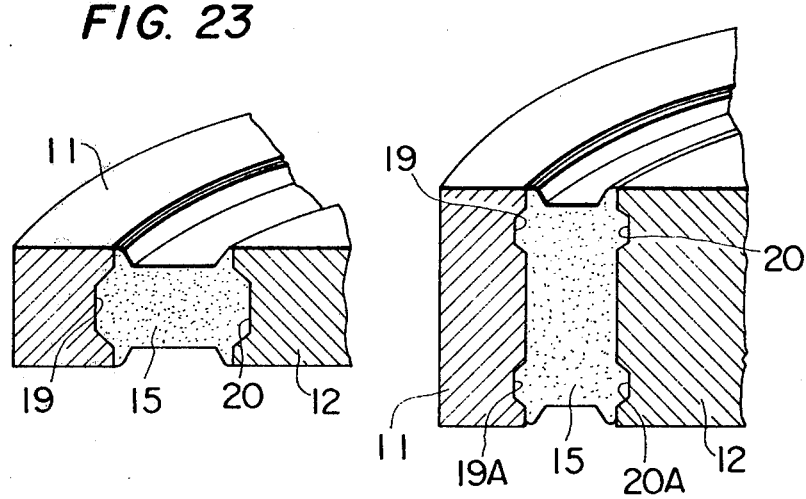
FIG. 25
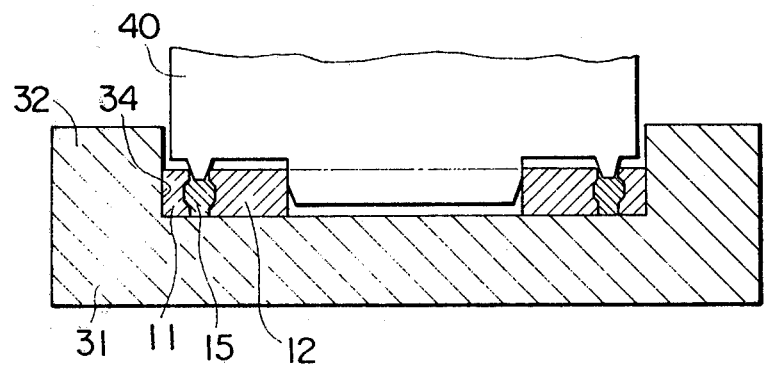

METHOD OF COUPLING TWO CONCENTRICALLY DISPOSED MEMBERS

BACKGROUND OF THE INVENTION

This invention relates to a coupling or combining process of two member to-be-coupled by the steps of arranging two members to-be-coupled so as to form an interspace between coupling faces of the two members, interposing a coupling member in the interspace and applying pressure in a cooling state to force the plastic or non-elastical flowing of the coupling member and more particularly a coupling process preferably used to strongly fix a shaft, plate, rod and cylindrical member made of metal or synthetic resin to each other.

There are welding including brazing and casting as methods to couple two members to-be-coupled by using a coupling member as a third member.

As is well known, welding causes thermal deformation owing to heating both member to-be-coupled and coupling member, so that a structure of high dimensional accuracy is difficult to obtain. In addition, there exists a limit in the selection of a material for the member to-be-coupled, the coupling member, electrode, brazing. Further, the welding is disadvantageous relative to productivity as well as to requiring large-scale facilities and being liable to occur faults in quality due to the dispersions of working conditions.

Also, with the casting process, the construction of equipment becomes complicated and larger in size due to the installation of an internal chill and a turning-preventing mechanism in order to ensure the coupling strength. Further, casting is disadvantageous the selection of materials for the coupling member is limited as well as productivity and accuracy.

There have also been known processes of inserting under pressure and of caulking in order to directly couple two members to-be-coupled.

As is well know, in the process of inserting in pressure there is a limit in strength and especially the produced products are weak to impacts. Further, this process has a defect in that it is difficult to obtain a required strength in a case of materials having less elongation such as casting iron.

With the process of caulking, there exists a limit in selection of materials for the members to-be-coupled and to be subjected to the caulking working; this means that materials having small deformation resistance must be selected. Thus, the sufficient coupling strength is not always obtained in any material construction, and especially it is impossible to obtain the sufficient coupling strength in a case of casting iron. Further, the caulking has a defect that the coupling strength is extreamly reduced, depending upon the employed temperature conditions, when there exists a large difference in the thermal coefficient of expansion of two members to-be-coupled.

Also, as a method to directly couple two members to-be-coupled, a method is know which comprises applying pressure on a first member to-be-coupled to force a part thereof to non-elastically flow in a groove formed on a second member to-be-coupled. However, in this method the part of the first member is not sufficiently inserted or bited into the groove and hence an interstitial gap between the first member and the surface of the groove occurs. This is due to a fact that when the pressure is applied on the end portion of the first member to-be-coupled by a metal mould, the generated stress in the end portion permits the deformation in the small constraint direction and it is impossible to give rise to a stress of such an extent of magnitude as induces a sufficient non-elastical deformation locally in only the groove part.

Moreover, a coupling process for coupling the members to-be-coupled by non-elastically deforming the coupling member interposed between the members to-be-coupled is also known.

U.S. Pat. No. 3,559,946 exists as prior art. According to this reference, each rectangular groove in section is formed on each coupling face of two members to-be-coupled and a coupling member is non-elastically deformed to force a part thereof to non-elastically flow. However, with this construction since the sectional figure of the groove is rectangular, after the coupling member has flown, an occurance of a gap between the surface of the groove and the flown coupling member cannot be avoided and hence acts to limit the strength of coupling force.

Further, U.S. Pat. No. 2,038,124 is known as another prior art. According to this reference, grooves which are semicircular in section are respectively formed on coupling faces of two members to-be-coupled, and a coupling member is given pressure for non-elastical deformation to be forced a part thereof to non-elastically flow into the grooves. However, with the construction the length of the coupling member is much larger than the width of a gap formed between the coupling faces of two members to-be-coupled and thus the given force is mainly consumed for friction generating between the coupling member and the members to-be-coupled within the gap. There exists a limit in magnitude of stress generated to force a part of the coupling member to non-elastically flow into the grooves. Accordingly, the large non-elastical flowing cannot be induced and hence, results to insufficiently fill the grooves by the coupling member.

Further, U.S. Pat. No. 2,804,679 is known as another prior art. According to this reference, two semicircular grooves are formed on a coupling face of a member to-be-coupled and a surface of the other member to-be-coupled is circular in section. According to this construction, since the grooves are formed on only one surface but not on the other surface, the large coupling force is not induced. Further, since the two grooves are in series, after a part of the coupling member has flown into a upper groove, a part of the coupling member is filled in a lower groove. Thus, the coupling member is given an action to be separated into a part remaining in the upper groove and another part flowing downwardly, so that a crack might be generated in the coupling member.

Further, U.S. Pat. No. 3,641,865 is known as another prior art. According to this reference, a groove being trapezoid in section is formed on a surface of a member to-be-coupled but not on the other surface of an opposite member to-be-coupled. According to this construction, since a groove is formed on only one surface but not on the other surface, large torque of cannot be transferred through the combination of two members to-be-coupled and a coupling member.

SUMMARY OF THE INVENTION

One object of the invention is to provide a coupling process of two members to-be-coupled which can generate a mechanically strong combination of two members to-be-coupled through a coupling member.

Another object of the invention is to provide a coupling process of two members to-be-coupled which can transfer a large torque from one member to the other member.

Another object of the invention is to provide a coupling process of two members to-be-coupled which, when a coupling member is applied with pressure for producing the non-elastical flowing, can make a loss of applied force smaller and hence can permit the sufficient non-elastical flowing of the coupling member.

Another object of the invention is to provide a coupling process of two members to-be-coupled considering the non-elastic flowing direction of a coupling member under pressure.

Another object of the invention is to provide a coupling process of two members to-be-coupled having the great productivity.

One feature of the invention is to form a concave portion, such as a groove, having a surface inclined in a flowing direction of a coupling member on a coupling face of a member to-be-coupled. Because of the inclined surface, when a coupling member is pressed and forced to non-elastically flow, a sufficient amount of the coupling member flows to fill up the concave portion and thus not only the surface of the concave portion and the coupling member are tightly contact but also the shearing force is generated between the member to-be-coupled and the coupling member.

Another feature of the invention is to form the above mentioned concave portions on both members to-be-coupled and thus to heighten the coupling force for the members by generating the tensile force and the shearing force between each member to-be-coupled and the coupling member.

Another feature of the invention is to make smaller a friction area existing between the members to-be-coupled and the coupling member upon the flowing of the coupling member along the members to-be-coupled and more especially to shorten the length of the friction area in the pressure direction.

More particularly, one aspect of the invention is to provide a coupling process of two members in which a first member to-be-coupled and a second member to-be-coupled are coupled by non-elastically deforming a coupling member, comprising the steps of:

forming a concave portion on a coupling face of each member to-be-coupled, having portions inclined to a flowing direction, defined below, of the coupling member on each coupling face of the first and second members to-be-coupled, arranging the first and second members to-be-coupled through a gap to form a space which comprises the two concave portions and the gap, interposing in the space the coupling member having smaller deformation resistance than that of the members to-be-coupled, applying pressure under a supported state for one end of the combining member on the other end by using a metal mould as preventing the swelling of the combining member to force non-elastical flowing of a part of the coupling member into the concave portions until the flowed part tightly contacts with the inclined planes, at this time, when the length of a rubbing face of the members to-be-coupled with the combining member in the pressure direction within the gap is defined by S and the width of the gap in the rectangular direction against the rubbing direction is defined by b, the volume of the coupling member is pre-determined so as to satisfy the following extent; $O \leq S \leq \frac{3}{4}b$, and to preferably satisby the following extent $\frac{1}{8}b \leq S \leq \frac{3}{4}b$.

Another aspect of the invention is to provide the coupling process of two members of wherein the inclined angle $\alpha_1$ of the inclined planes to the coupling face is respectively made so as to satisfy the following extent;

$$20° \leq \alpha_1 \leq 70°.$$

Another aspect of the invention is to provide a coupling process of two members in which a first member to-be-coupled and a second member to-be-coupled are coupled by non-elastical deforming a coupling member, comprising the steps of;

forming a concave portion on a coupling face of each member to-be-coupled, with a plane inclined to a flowing direction, defined below, of the coupling member on each coupling face of the first and second members to-be-coupled, arranging the first and second members to-be-coupled through a gap and positioning the two concave portion in the substantially same height opposite to each other, so that a space is formed by the gap and the two concave portions, interposing in the space the coupling member having smaller deformation resistance than that of the members to-be-coupled, and applying pressure in a supported state for one end of the coupling member on the other end by using a metal mould as preventing the swelling of the coupling member to force non-elastical flowing of a part of the coupling member into the concave portions until the flowed part tightly contacts with the inclined planes, so that each member to-be-coupled and the coupling member are coupled by tensile force and shearing force due to the concave construction.

BRIEF DESCRIPTION OF THE DRAWINGS

FIG. 22 shows a section XXII—XXII in FIG. 21, FIG. 23 is a view showing an example in which a coupling member is pressed from above and below, FIG. 24 in a view showing a modification of the shape of an interstice portion, FIG. 25 is a view showing an example in which, when a member to-be-coupled on the outer side lacks in rigidity, it is reinforced by a metal mold.

DETAIL EXPLANATION OF THE PREFERRED EMBODIMENT

A preferred embodiment of the invention will be explained in reference to drawings.

Figure 1:
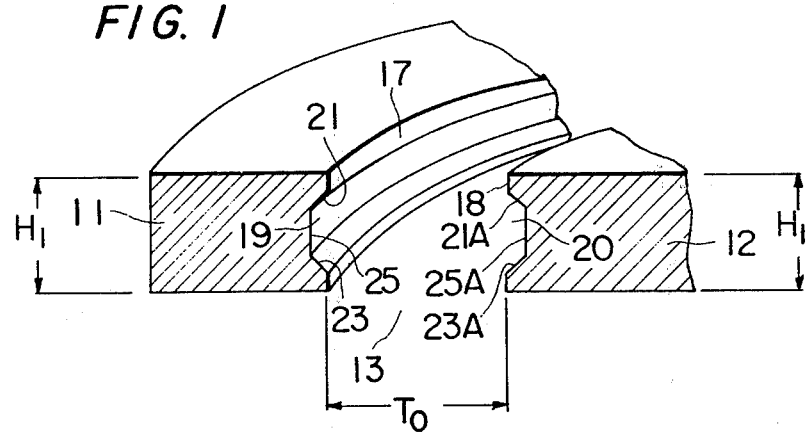
FIGS. 1 to 5 are perspective views including a partial crosssection, showing steps to practice processes according to the invention.
Figure 2:
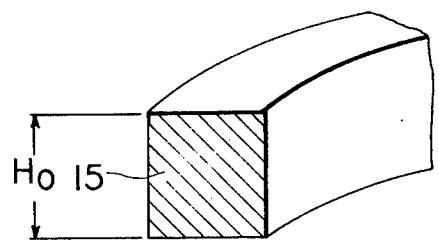

FIGS. 1 to 6 are views illustrating processes for coupling two metal members to-be-coupled. In FIGS. 1 and 2, both of a first member 11 to-be-coupled and a second member 12 to-be-coupled are metallic circular plates. The first member 11 has a bore 13 at the center portion and the second member has an outside diameter being slightly smaller than the diameter of the bore 13.

A coupling member 15 is a ring rectangular in section which consists of a metal more liable to be non-elastically deformed than the members 11, 12, that is, a metal with a deformation resistance smaller than that of the members 11, 12.

Grooves 19, 20 are respectively formed on coupling faces 17, 18 of the members 11, 12 in the direction right-angled to the coupling faces, namely in the spherical direction. These grooves 19, 20 have respectively, upper planes 21, 21A, lower planes 23, 23A and bottom planes 25, 25A, and as shown in the figures the upper planes is formed in inclination to the coupling faces 17, 18. The lower planes are also formed in opposite inclination to the coupling faces 17, 18. The bottom planes are formed in parallel to the coupling faces 17, 18.

When the second member 12 to-be-coupled is interposed in the bore 13 of the first member 11 to-be-coupled, in a case that the inside diameter of the first member 11 is defined by $d_1$ and the outside diameter of the second member 12 is defined by $d_2$, a gap of $(d_1-d_2)/2 = T_0$ is formed between the first and second members. The width of the ring-shaped coupling member 15 is almost equal to $T_0$ or slightly smaller than $T_0$. The height of the members 11, 12 are equal to each other and shown by $H_0$. The height $H_1$ of the ring-shaped coupling member 15 is made slightly taller than $H_0$. There is no problem, even if $H_1$ is made equal to $H_0$ or slightly lower than $H_0$. When $H_1$ is made taller than $H_0$, the difference $H_1 - H_0 = \Delta H$ is desirable to be as small as possible and for example it is preferable to be formed in an extent of 0.2 to 0.3 mm. The reason will be explained hereinafter.

Figure 3:
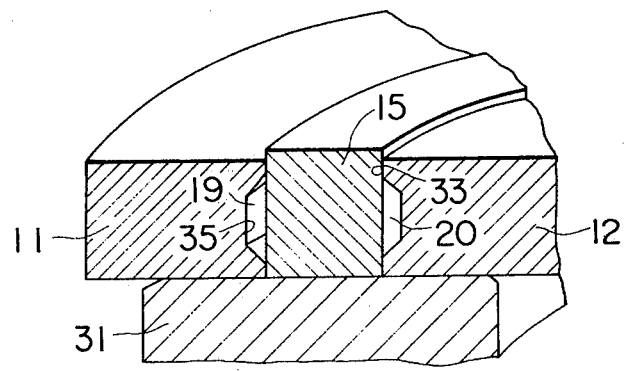
Figure 4:
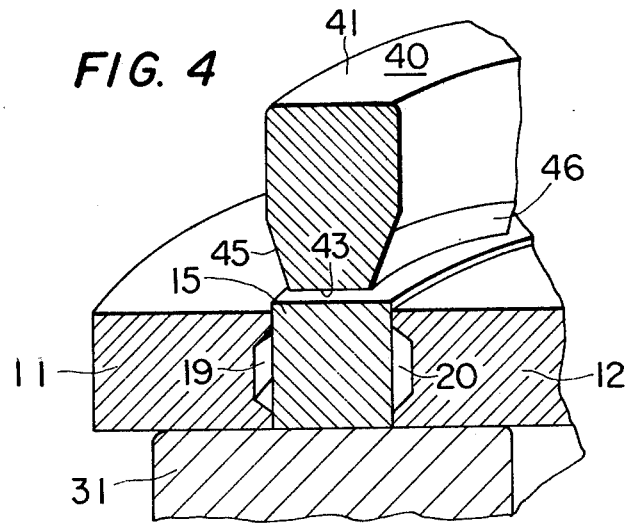
Figure 5:
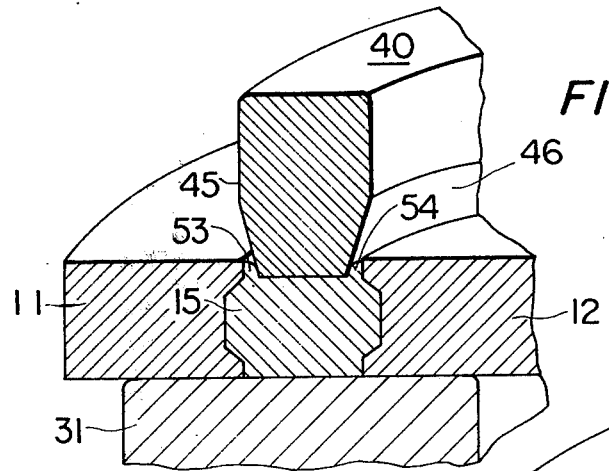

With regard to the coupling processes, at first as shown in FIG. 3 both of the members 11, 12 are set on a supporter 31 and the coupling member 15 is interposed in a gap 33 formed between the members 11, 12. The width of the gap 33 is equal to $T_0$. A space 35 consists of the gap 33 and two grooves 19, 20. It will be understood that the coupling member 15 is put in the space 35. After such an arrangement, a metal mould is set above the coupling member 15. The metal mould 40 has a main body 41, a tip end 43 with the width smaller than the width $T_0$ of the gap and side walls 45, 46 inclined of perpendicularly as shown in the figure. Upon the accomplishment of the said-mentioned preparation, as shown in FIG. 5 the metal mould 40 is actuated by an operation source (not shown in the drawing) to move downwardly. Thus, the metal mould 40 applies pressure on the coupling member 15 to force the coupling member 15 to undergo nonelastical deformation, so that a part of the coupling member is permitted to flow into the grooves 19, 20 at the same time. It is possible to practice the interposing process shown in FIG. 3 by employing the pressure of the metal mould.

The width t of the tip end 43 is made slightly narrower in comparison with the width $T_0$ of the gap and thus, upon pressure, a part of the coupling member 15 is prevented to escape or flow out through narrow gaps formed between the coupling faces 17, 18 of the members 11, 12 and the inclined side surfaces of the metal mould 40 and only a slight part of the coupling member 15 remains within the gaps. It is to be noted that the inclined direction of the upper planes of the grooves is consistent with the flowing direction of the coupling member 15 which is just non-elastically deforming, at the time when the coupling member 15 is applied in pressure and forced to non-elastically flow with the metal mould 40 such that the grooves 19, 20 are filled up by the flowed part. By employing such a way, upon pressure, a part of the coupling member 15 smoothly flows into the grooves and hence, sufficiently and perfectly fills up the grooves 19, 20. That is, the coupling member 15 and the surfaces of the grooves are tightly contacted, and even after the pressure force has been removed the surfaces of the grooves and the coupling member 15 give the shearing force to each other so that the great combination is obtained. Further, on the basis of such an opposite groove arrangement, the great tensile force for the coupling member 15 is obtained.

Figure 6:
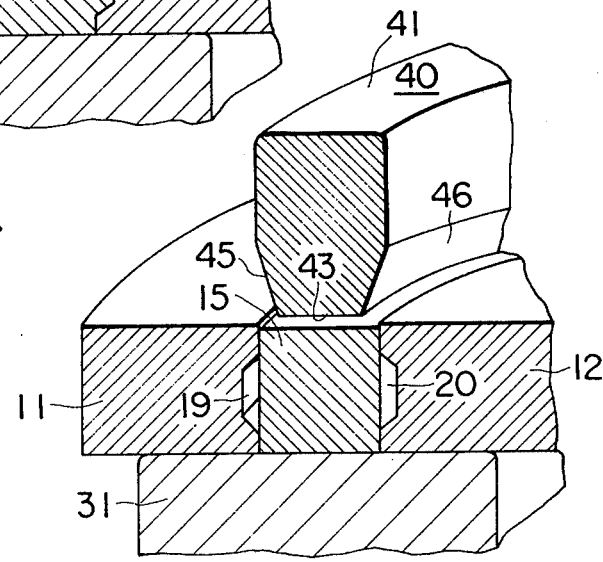
FIG. 6 is a perspective view showing a modification of the embodiment shown in FIG. 4.

As shown in FIG. 6, a coupling member 15 which has $H_1$ lower than $H_0$ may be used as explained above.

Figure 7:
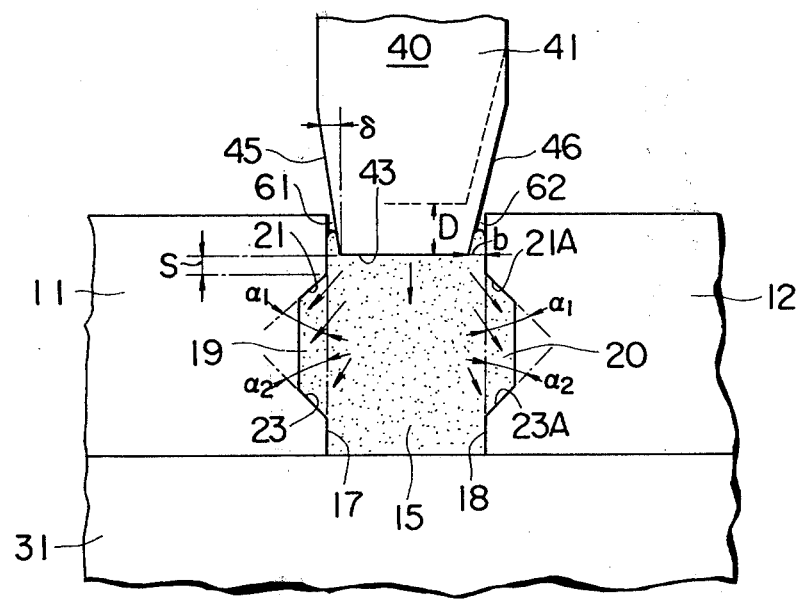
FIG. 7 is a schematic view illustrating a state in which a coupling member is deformed upon applying pressure on the coupling member.

As shown in FIG. 7, the side walls 45, 46 of the metal mould 40 is inclined by $\delta$ to the perpendicular direction, namely the pressure direction, to the tip end 43. It is desirable for $\delta$ to be put in an extent of 3° to 15°. This is why if $\delta$ is smaller than 3°, the metal mould 40 cannot be smoothly put out and if $\delta$ is larger than 15°, a part of the coupling member 15 easily flows in the direction reverse to the interposing direction of the metal mould 40, namely into the gaps 61, 62 formed between the coupling faces 17, 18 and the side walls 45, 46. Further if $\delta$ is made larger than 15°, neither the interposing depth of the metal mould 40 can be deeper nor the larger inner stress can generate within the coupling member 15, so that the larger coupling force cannot be obtained.

It is preferable that the body 41 of the metal mould 40 is interposed to make small the distance S between the tip end 43 and the upper end of the grooves 19, 20 of the member 11, 12, namely to interpose the tip end 43 as deeply as it comes adjacent to the grooves 19, 20. Since the S represents the length of the friction area of the members with the coupling member in the pressure direction in the gap, by making the S smaller, the frictional loss along with the non-elastical flowing becomes smaller, so that a part of the coupling member 15 is sufficiently interposed into the grooves and hence, fills up the grooves.

It is preferable that the angle $\alpha_1$ of the upper plane is defined at 45° which is the non-elastical flowing direction of the combining member 15 and the range of 25° to 70° is practical. In this embodiment, a plane is employed; which means that the plane is the most preferable embodiment, and thus it will be understood that curved surfaces are also employable. In the case, the tangent line at the most upper end is selected to be made smaller than a right angle and a middle area is selected to be made in an extent of 25° to 70°.

An angle $\alpha_2$ of the lower plane may be formed within an right angle including 90°, because the coupling member 15 is not caused to flow out along the lower plane. Instead of the lower plane, curved surfaces are employable, but the plane figure is most preferable.

Figure 8:
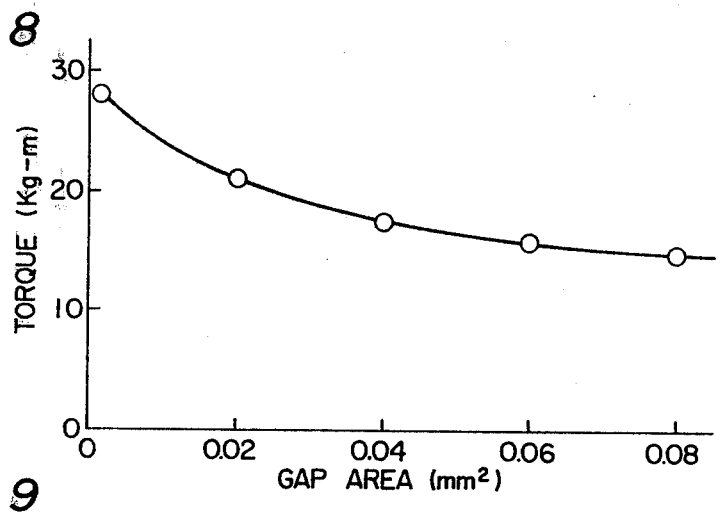
FIG. 8 is a graphic diagram illustrating test results depending upon Torque and Gap area.

In a case of 45° of angle $\alpha_1$, 85 kg/mm$^2$ of pressure force, 0.45 mm of groove depth, OFC−½H (no organic copper) as a material of the coupling member and soft steel as a material of the members to-be-coupled, test results are shown in FIG. 8, relating to the torque obtained by the combination and the gap area. In the figure the ordinate is representing torque and the abscissa is representing a gap area.

As being apparent from the figure, with the increase of the gap area, the obtained torque is made smaller.

Figure 9:
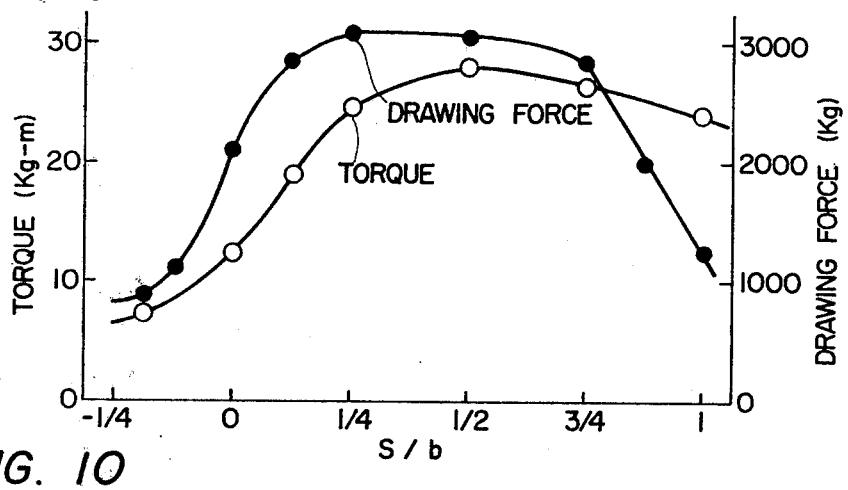
FIG. 9 is a graphic diagram illustrating test results depending upon Torque and S/b.

In identical conditions to FIG. 8, test results are shown in FIG. 9, relating to the obtained torque as well as the drawing force and the S/b in which the length S of the friction area is divided by the width b of the gap. In the figure, the left ordinate represents torque and the right ordinate represents the drawing force, and the abscissa represents the S/b. As is apparent from the figure, in an extent of 0 to ¼ of S/b, a large drawing force, namely about 1200 to 3000 kg of drawing force was obtained. In an extent of ⅛ to ¾, about 3000 kg of drawing force was obtained, so that the extent is practically preferably selected. Besides, in these extent, a large torque was also obtained.

Figure 10:
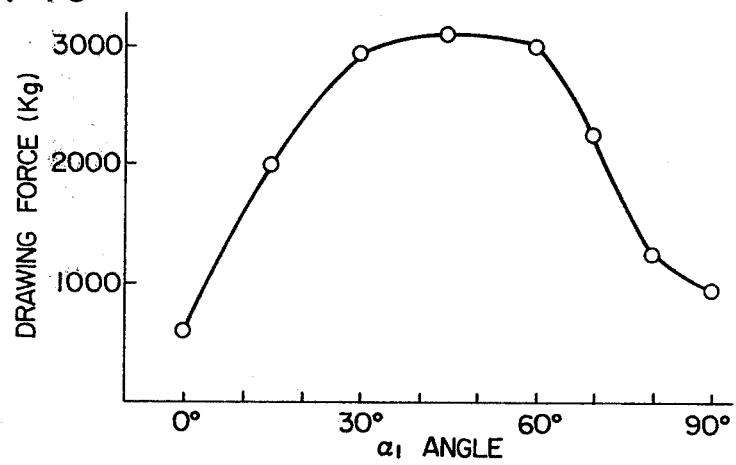
FIG. 10 is a graphic diagram illustrating test results depending upon Torque and $\alpha_1$ angle.

In a case of ½ of S/b, 85 kg/mm$^2$ of pressure force, 0.45 mm of groove depth, OFC−½H (no organic copper) as a material of the coupling member and soft steel as a material of the members to-be-coupled, test results are shown in FIG. 10, relating to torque and angle $\sigma_1$ of the upper plane to the coupling faces. In the figure, the ordinate represents torque and the abscissa represents angle $\alpha_1$.

As being apparent from the figure, large torque is obtained in an extent of 20° to 70°. At 45°, The largest torque is obtained at 45° and a large and stable torque is obtained in an extent of 30° to 60°.

The interposing depth D of the metal mould 40 is selected in that the coupling member 15 is sufficiently filled up in the grooves 19, 20 and the required tensile force is given on the coupling member 15 from the member 11, 12 through the surfaces of the grooves. Further, the interposing depth D is preferably determined in that the bottom surface 43 of the metal mould is positioned above the upper end of the upper plane, because the tensile force is avoided to be removed after the removal of the metal mould 40.

Figure 11:
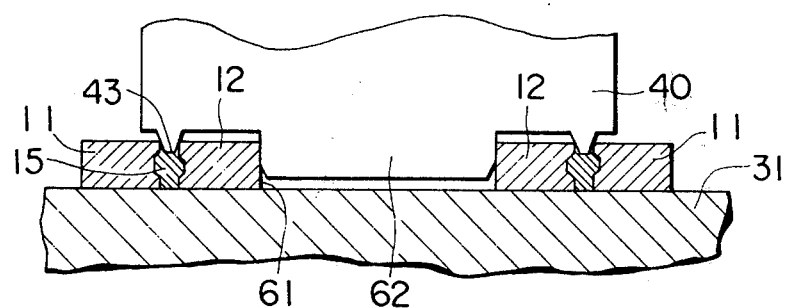
FIG. 11 is a view showing a modification of a metal mould.

In a case that the member 12 has the bore 61 at the center portion as shown in FIG. 11, an arrangement can easily be made, upon applying pressure, by the installation of a guide 61 having a projecting portion which contacts with an inner spherical surface of the bore 61.

Figure 12:
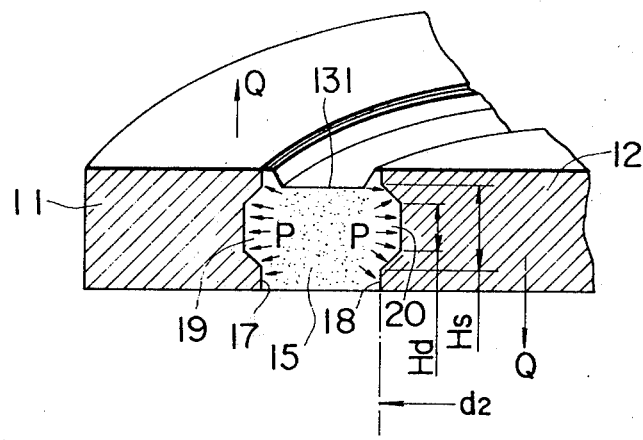
FIG. 12 is a perspective view illustrating a state after the coupling.

FIG. 12 is a diagram showing the state in which the coupling has been completed. In the figure, tensile forces P act inside the coupling member 15 and firmly stretch the groove 19 and the coupling face 17 of the first member to-be-coupled 11, and the groove 20 and the coupling face 18 of the second member to-be-coupled 12. Here, in order to keep the construction as in the figure, it is a requisite that the material of the first member to-be-coupled 11 as well as the second member to-be-coupled 12 is harder and higher in rigidity than the material of the coupling member 15. This is because, while the coupling member 15 is pressed by the metal mould 40 to plastically flow, the first member to-be-coupled 11 and the second member to-be-coupled 12 must be sufficiently rigid without being deformed (though they are somewhat distorted). In other words, it is a requisite that the coupling member 15 is of a material whose deformation resistance is lower than that of the material of the first member to-be-coupled 11 as well as the second member to-be-coupled 12. For example, in case where the first and second members to-be-coupled are of a steel material; a material such as aluminum, brass, copper and soft steel is used for the coupling member.

Although the coupling member itself may be a non-metallic material, it is required to have fixed mechanical strengths on shear, compression, bending etc. Needless to say, the magnitudes differ depending upon the service conditions of the members to-be-coupled. Now, the relationship between the height $H_0$ of the coupling member 15 and the height $H_1$ of the interstice portion of the member to-be-coupled will be stated.

Figure 13:
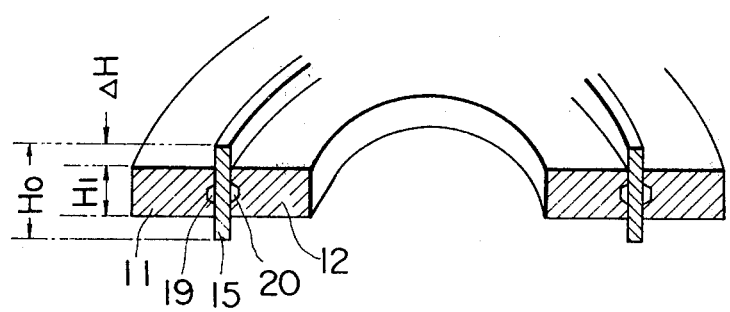
FIGS. 13 to 15 are schematic views illustrating a phenomenon occuring in a case that the length of a coupling member is not suitable.
Figure 14:
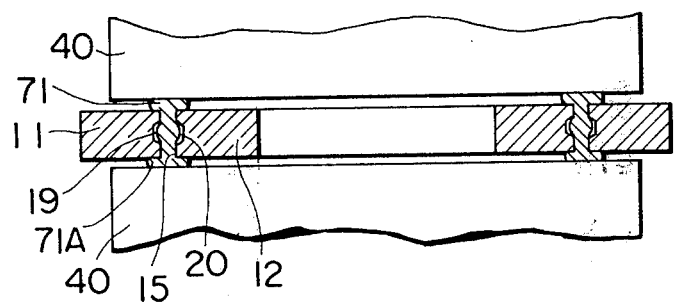
Figure 15:
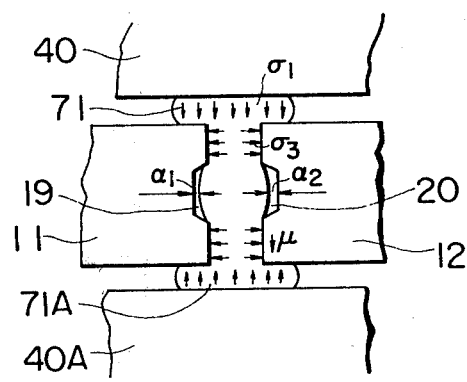

In order to cause the coupling member 15 to flow sufficiently into the space portion 35 between the members to-be-coupled, the volume of the coupling member may be the capacity of the interstice portion. However, when the coupling is done with the coupling member 15 with which the difference $\Delta H$ of the heights is comparatively great as shown in FIG. 13, the end parts of the coupling member are deformed as illustrated in FIG. 14. As illustrated in FIG. 15, accordingly, even when the volume of the coupling member is greater than the capacity of the interstice portion, voids $\delta_1$ and $\delta_2$ are respectively left near the grooves 19 and 20.

Figure 16:
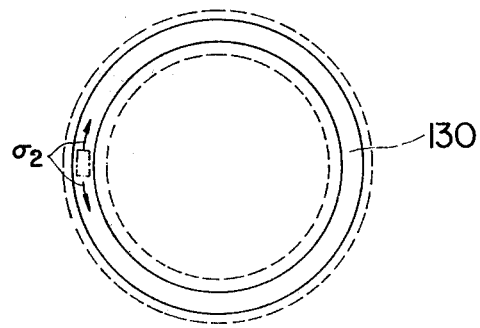
FIGS. 16 and 17 are schematic views illustrating stresses generated upon applying pressure.
Figure 17:
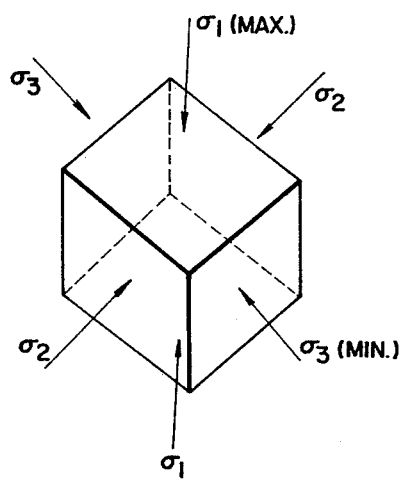

This is based on the following reason. Referring to FIG. 15, when the ring-shaped coupling member 15 is compressed in the axial direction by the metal moulds 40 and 40A, internal stresses $\sigma_1$, $\sigma_2$ and $\sigma_3$ are respectively generated in the axial direction, the circumferential direction and radial direction in the coupling member as shown in FIGS. 16 and 17. On the other hand, letting $K_f$ denote the deformation resistance of the coupling member, there is the relation:

$$\sigma_1 = (1 \text{ to } 1.5) K_f \tag{1}$$

During the pressing, the vicinities of both the ends of the coupling member 15 are subject to no constraint force in the radial direction. Therefore, when $\sigma_1$ is the maximum, $\sigma_3$ becomes the minimum.

Accordingly, the following relation holds from TRESCA's equation which gives the condition of yielding:

$$K_f \sigma_1 - \sigma_3 \qquad (2)$$

Substituting Equation (1) into Equation (2):

$$\sigma_3 = \sigma_1 - K_f \qquad (2)'$$

$$= (1 \text{ to } 1.5) K_f - K_f = (0 \text{ to } 0.5) K_f \qquad (3)$$

That is, a stress enough to plastically deform the coupling member in the radial direction, i.e., into the grooves of the members to-be-coupled is not generated.

On the other hand, according to the method of this invention as illustrated in FIG. 12, the coupling member 15 is constrained substantially wholly by the interstice portion 35 and the convex portion of the metal mold during the pressing. Therefore, $$\sigma_1 = (2 \text{ to } 4) K_f \qquad (4)$$

Substituting this into Equation (2)':

$$\sigma_3 = (2 \text{ to } 4) K_f - K_f$$

$$= (1 \text{ to } 3) K_f$$

and a stress equal to or greater than the deformation resistance $K_f$ develops.

Accordingly, the coupling member flows perfectly into the grooves.

In order to constrain the coupling member during the pressing in this manner, the height $H_1$ of the coupling member may be substantially equal to or less than the height of the interstice portion. However, when the height of the coupling member is too small, the insertion stroke of the convex portion of the metal mold needs to be made great for the sufficient inflow of the coupling member into the grooves, but the stroke is limited because $\theta$ cannot be made very small. It should be accordingly set the volume of the coupling member at a range somewhat smaller than the volume of the interstice portion and to determine the height $H_1$ in consideration of the width $T_0$ of the interstice portion, the angle of inclination $\theta$ of the metal mold, etc.

Figure 18:
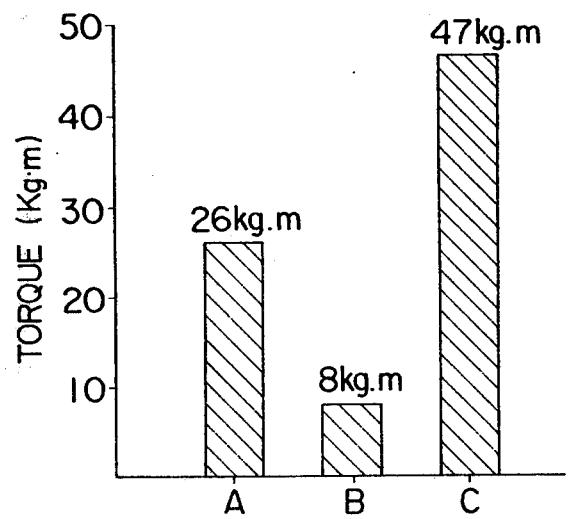
FIG. 18 is a graph showing the comparative results of coupling forces in the method of this invention and in other methods as obtained in terms of turning moments or torques.
Figure 19:
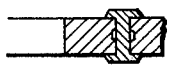
FIG. 19 is an explanatory view of the respective methods in FIG. 18.
Figure 19:
Figure 19:
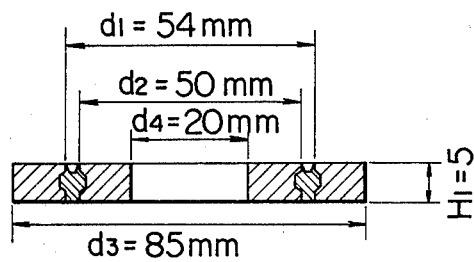
Figure 19:
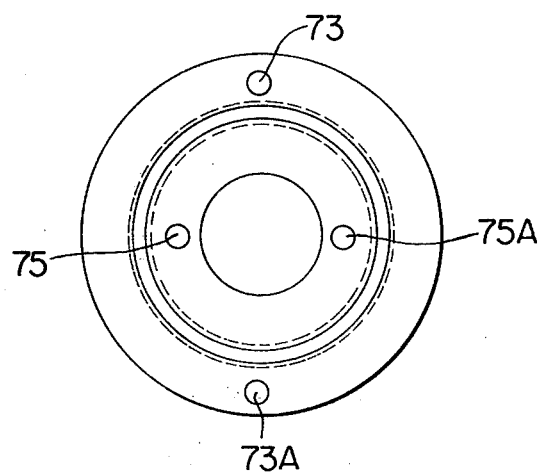

FIG. 18 is a diagram of the comparisons of coupling forces based on the coupling method of this invention and other methods. In the diagram, A corresponds to a method in FIG. 19(A) or the method explained with reference to FIGS. 13 to 15; B corresponds to a method in FIG. 19(B) or the hitherto-known method deforming an end portion of an object to-be-coupled; and C corresponds to a method in FIG. 19(C) or the coupling method of this invention. A coupling material is soft steel, and diameters $(d_1-d_4)$ are dimensions (in mm) indicated in FIGS. 19(C) and (D), respectively. Hi is 5 mm. Numerals 73, 73A and 75, 75A designate holes for measuring turning moments or torques. The torque is 26 kg.m with the method (A) and is 8 kg.m with the method (B), whereas a high torque of 47 kg.m is obtained according to the method (C) of this invention. The reason why such a high torque is obtained is that, as already stated, the interstitial groove portions between the members to-be-coupled are completely filled with the coupling member, to produce a great drag.

Figure 20:
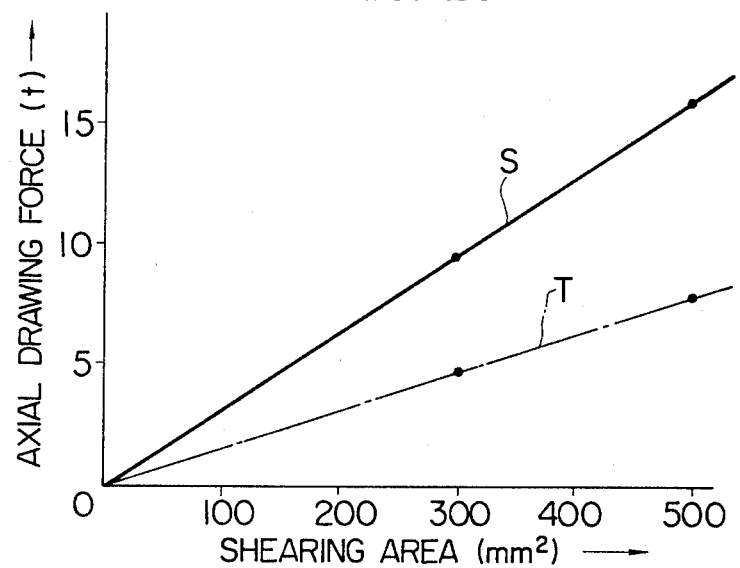
FIG. 20 is a graph indicative of the magnitudes of axial drawing forces in the case of varying the shearing area for the individual materials of coupling members.

On the other hand, the axial drawing force becomes as shown in FIG. 20.

Here, the shearing area A becomes $\pi d_2 H_s (\text{mm}^2)$ when represented by the outer diameter $d_2$ of the object to-be-coupled 12 and the length $H_s$ of the groove 20 indicated in FIG. 12. In the drawing, $H_d$ is the groove of the bottom face. The pulling force varies depending upon the mechanical strengths of coupling materials (soft steel and copper) and the shearing area. In the drawing, the force applied in a case of soft steel S is 32 kg/mm$^2$ and the force applied in a case of copper T is 16 kg/mm$^2$.

Figure 21:
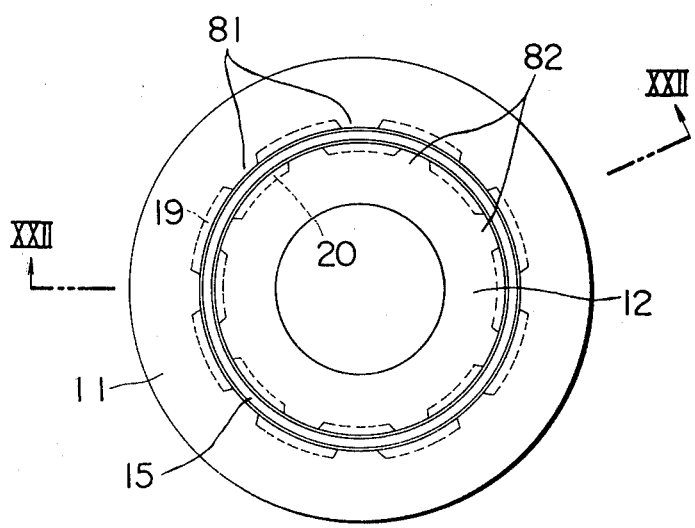
FIG. 21 is a view showing a modified embodiment of this invention for increasing the torque.

In order to further raise the torque, axially-extending concave and convex portions 81 and 82 may be disposed intermittently on the circumferences of the joining end faces of the members to-be-coupled 11 and 12 as illustrated in FIGs. 21 and 22.

FIG. 23 shows a perspective view of a partial section in another embo;iment of this invention. Unlike the embodiment mentioned above, this embodiment presses the coupling member 40 from both the surfaces thereof by using two metal moulds idential in a shape. By pressing in this way more stable tensile forces are attained.

FIG. 24 shows a perspective view of a partial section in another embodiment of this invention. In this embodiment, two grooves, namely, recesses 19 and 19A and recesses 20 and 20A are formed in the first member to-be-coupled 11 and the second member to-be-coupled 12 respectively. Also, with such a construction, identical shaped metal moulds is used to apply pressure from upper and lower directions. Such a construction is effective in case where the thickness of the member to-be-coupled is great.

Even when the deformation resistance of the member to-be-coupled is greater than that of the coupling member, the member to-be-coupled is deformed during the coupling if its wall thickness is small, and it is difficult to cause the coupling member to effectively flow into the voids. In such a case a keeper portion 32 may be provided at part of a support 30 on the side lacking in rigidity as illustrated in FIG. 25 to contact with an outer surface of the member to-be-coupled lack in rigidity, whereby the lack in rigidity can be compensated for. The same applies to a case where both the members to-be-coupled lack in rigidity.

As apparent from the foregoing embodiments, this invention is applicable to a case where the interstice portion is maintained in the fixed state by the two members to-be-coupled. For example, the combination of two concentric discs and the combination of a shaft and a disc correspond to the case. That is to say, upon applying pressure on the coupling member 15 by using the metal mould 40, a part of the coupling member is forced to flow into the grooves 19, 20 by preventing a swelling phenomenon. In contrast, in case where the interstice portion is not maintained in a fixed-shape state by two members to-be-coupled as in case of mere two parallel plates, no coupling force is obtained even when the coupling member is inserted between the two members to-be-coupled. In other words, by the insertion of the coupling member, tensile forces must act between it and the members to-be-coupled.

This invention as above stated has effects to be described below. Since required tensile forces P can be applied to the coupling faces 17 and 18 and the concave portions 19 and 20, a mechanically stable coupling force can be attained. Since the concave portions 19 and 20 are filled with the coupling object 15, the drawing-out force Q becomes the value of the product between the shearing strength and shearing area of the material of the coupling member 15, and it is a very great value. Further, since the first member to-be-coupled 11 and the second member to-be-coupled 12 is of a material which is higher in deformation resistance (more solid) than the coupling member 15, the first and second members to-be-coupled are not distorted by the pressing and plastic flow, and high precision is maintained. This signifies that, in case of the present coupling method, the members to-be-coupled can be assembled in the form in which they have been put into the dimensional accuracy of the final product and subjected to a surface treatment in advance. The method can therefore be said to be an advantageous assembling method. In addition, any material required for the product construction can be selected for the first member to-be-coupled 11 and the second member to-be-coupled 12. This is because a material whose deformation resistance is lower than that of the material of the objects to-be-coupled 11 and 12 may be selected for the coupling member 15. Further, the coupling material may be in a simple shape and is joined by the cold working, so that the process of production is simple, that the productivity is high and that small-scale equipment such as hydraulic press for pressure application suffices. As to the quality, the tensile forces P can be ensured and stabilized merely by controlling the pressure of the pressing.

The embodiments thus far described concern the fundamental constructions of this invention.

Hereunder, examples of practical applications to products will be described together with the effects.

Figure 26:
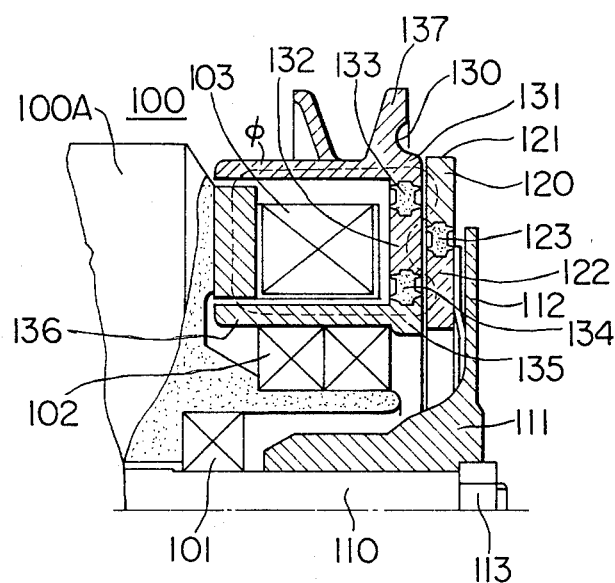
FIG. 26 is a view showing a vertical section of the essential portions of an electromagnetic clutch to which the coupling method of this invention is applied.

FIG. 26 shows a partial half section of an electromagnetic clutch which has adopted this invention.

An electromagnetic clutch 100 is mounted on the proper 100A of a compressor for a car cooler. A boss 111 is fixed by a nut 113 to a shaft 110 of the compressor which is journalled in bearings 101. A disc 120 is formed through a spring 112. The disc 120 has adopted this invention, it is constructed of concentric discs 121 and 122 made of a magnetic material (steel material) and a coupling member 123 made of a nonmagnetic material (brass). The coupling member 123 has filled an interstice portion between the discs 120 and 122 to couple the members to-be-coupled by the above mentioned coupling method.

A rotor 130 is mounted on the compressor proper 100A through bearings 102. The rotor 130 is constructed of the three concentric discs of a rotor plate 131, a rotor plate 132 and a rotor plate 135 made of a magnetic material (steel material), and a coupling member 133 and a coupling object 134 made of a nonmagnetic material (brass). The coupling members 133 and 134 has filled an interstice portion between the rotor plates 131 and 132 and an interstice portion between the rotor plate 132 and 135 to couple the plates. A rotor boss 136 and a pulley 137 are respectively made integral with the rotor plate 135 and the rotor plate 131 by welding. A belt (not shown in the figure) engages the pulley 137, and the compressor 100A is driven by an automobile engine.

A magnet coil 103 is constructed of a yoke and a coil, and is directly fixed to the compressor proper 100A.

Now, the operation will be explained. When the electromagnetic clutch 100 is not energized, only the rotor 130 which is driven by the engine through the pulley 137 is rotated, and the disc 120, boss 111 and shaft 110 which are released through interspaces are stationary. When the magnet coil 103 is energized, a magnetic flux $\phi$ flows as indicated by a broken line. That is, it flows along the yoke of the magnet coil 103→pulley 137→rotor plate 131→gap→disc 121→gap→rotor plate 132→gap→disc 122→gap→rotor plate 135→rotor boss 136. Owing to the magnetic flux $\phi$, the disc 120 is attracted by and electromagnetically coupled with the rotor 130, and it is rotated. Accordingly, the shaft 110 is synchronously rotated through the spring 112→boss 111.

Here, the coupling members 123, 133 and 134 are endowed with mechanical strengths enough to endure a rotational torque respectively, and they are made of the nonmagnetic material which does not permit the magnetic flux to pass therethrough as described above, so that the magnetic flux leakage can be minimized.

Figure 27:
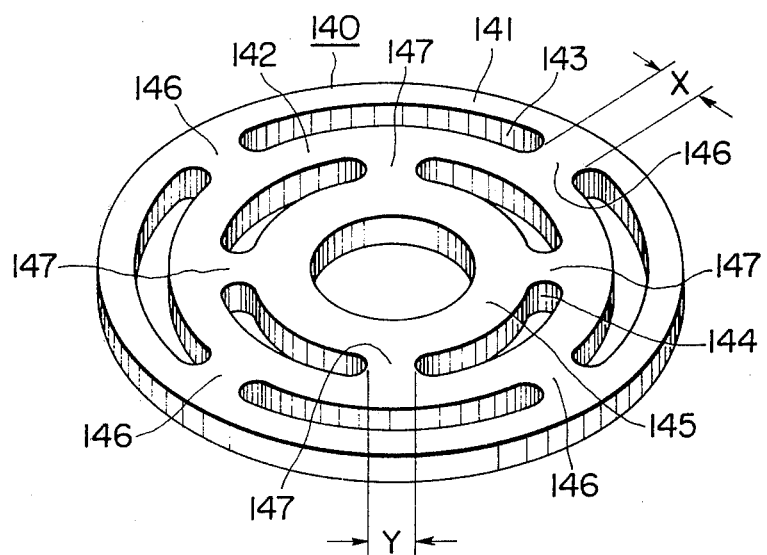
FIG. 27 is a perspective view showing the external appearance of a prior-art clutch plate which corresponds to the clutch plate of FIG. 28.

FIG. 27 is a perspective view showing a disc portion of a rotor 140 in a prior-art type electromagnetic clutch. Referring to the figure, the disc portion has been punched from a single steel plate with a press. It is formed of a rotor plate 141, a rotor plate 142 and a rotor plate 145, four connecting portions 146 extending radially and each having a width X, four connecting portions 147 extending radially and each have a width Y, and grooves 143 and 144. Although not shown in the figure, also a prior-art type disc has a construction equivalent to that of the rotor 140.

In this prior-art type rotor 140, the magnetic flux $\phi$ flows also into ineffective magnetic paths of the connecting portions 146 and the connecting portions 147. Therefore, the effective magnetic flux diminishes, and the electromagnetic clutch inevitably becomes large-sized.

By adopting the coupling method according to this invention in which the coupling member of the nonmagnetic material is interposed, the rotor 140 can be freed from the ineffective magnetic paths such as the connecting portions 146 and the connecting portions 147 in the prior-art structure as described above. In an electromagnetic clutch for a car cooler, the outside diameter dimension has been reduced about 20%.

Figure 28:
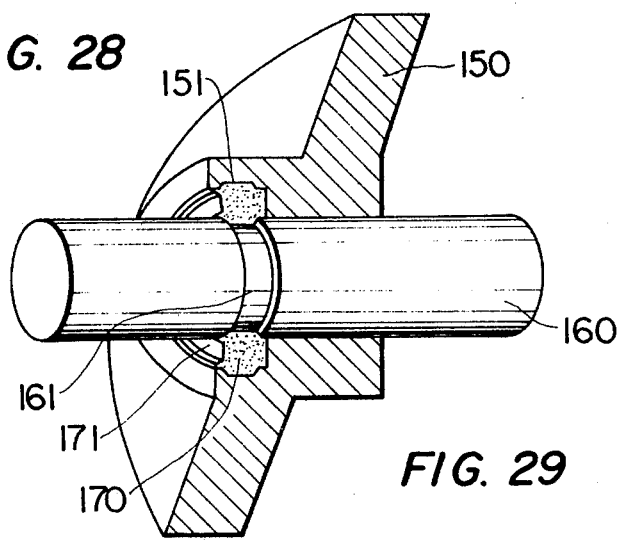
FIG. 28 is a view showing a vertical section of the essential portions of a swash plate compressor to which the coupling method of this invention is applied.

FIG. 28 is a perspective view, partly in section, showing the method according to this invention for coupling a swash plate 150 and a shaft 160 of a swash plate type compressor for a car cooler. The swash plate 150 of the compressor for a car cooler turns the rotation of the shaft 160 into the reciprocating motion of a piston which engages the swash plate through balls or the like. It is made of cast iron, which is a material of slight elongation. Therefore, it has hitherto been coupled by the shrinkage fit. However, it is subject to limitations in oscillations and impact forces, and it gives rise to such inconveniences as loosening under severe conditions.

In this invention, a concave portion 151 is formed in the inner surface of the swash plate 150 of the compressor, the corresponding concave portion 161 is formed in the outer periphery of the compressor shaft 160 made of special steel, and a coupling object 170 made of a soft steel material of low deformation resistance is inserted into the interspace and pressed to plastically flow into the respective concave portions 151 and 161, whereby the swash plate and the shaft are coupled.

Thus, the compressor swash plate 150 exhibits a mechanical strength which is satisfactorily stable against rotation, thrust loads and impacts, and the working method is simple.

Figure 29:
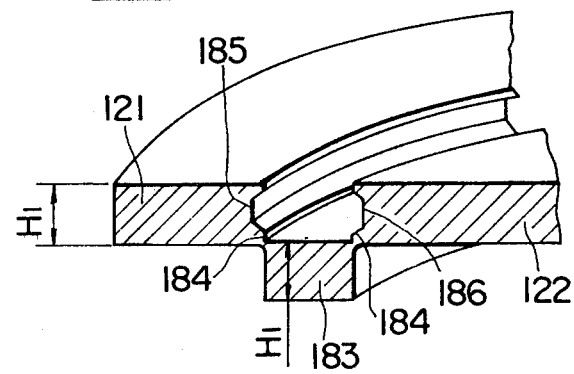
FIG. 29 is a perspective view of essential portions showing a modification of the coupling method of this invention.

FIG. 29 shows another embodiment of this invention, and is a perspective view, partly in section, of a member to-be-coupled.

As in the case of the disc 120 in FIG. 26, the first member-to-be-coupled 121 with a thickness $H_1$ and the second member to-be-coupled 122 are often worked from an identical thick plate material by the method of punching or the like. In such a case, the first member to-be-coupled 121 and the second member to-be-coupled 122 are not separated, but they are put into the form in which they are joined by slight joining parts 184 by shear-moving a connecting member 183 as shown in FIG. 29. Subsequently under the joined state, a concave portion 185 and a concave portion 186 are simultaneously machined and formed. In this state, the steps as mentioned above are executed to couple the members to-be-coupled into the integral form, whereupon the joining parts 184 are cut off to remove the connecting member 183.

Mentioned as the effects of this invention are that the working of the concave portions is done at one step and that the number of components is small, the productivity being good.

Figure 30:
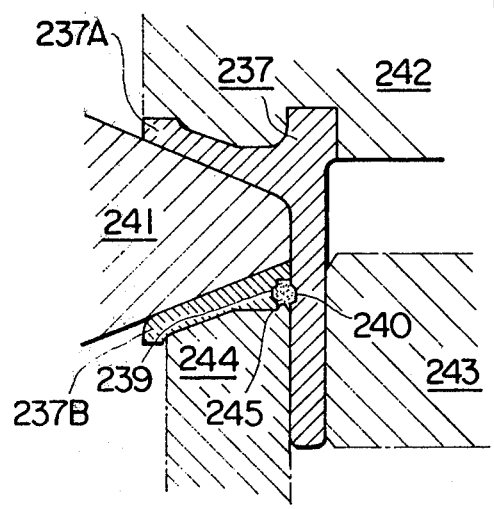
FIG. 30 is a view showing a vertical section of the essential portions of a V-pulley to which the coupling method of this invention is applied.

FIG. 30 shows an example in which this invention is applied to the fabrication of the V-pulley 137 shown in FIG. 25.

Heretofore, the coupling has been made by welding the inner end part of a pulley segment 237B to the boss part of a pulley segment 237A. With this method, a thermal deformation appears after the welding, so that the post-working of a V-groove surface is necessary.

In case of adopting the coupling method of this invention, grooves 239 and 240 are formed in the corresponding parts of the respective pulley segments 237A and 237B in advance, the segments are kept by metal A moulds 241, 242 and 243, and a coupling member 245 is inserted into the grooves by a metal mould 244, whereby the pulley segments can be plastically coupled.

According to the method of this invention, the coupling strength is stable. Further, since the thermal deformation due to the welding or the like does not develop, the pulley segments 237A and 237B as previously plated can be assembled as they are. Therefore, the segments can be made integral in a component assembly line, and the productivity is high.

Besides the examples of applications stated above, this invention is extensively applicable to the couplings of discs, cylinders, shafts, circular columns, flat plates, rods etc., such as the cylinder and the shaft, and the shaft and the plate.

What is claimed is:

1. A process of two coupling members in which a first member to-be-coupled and a second member to-be-coupled are coupled by non-elastically deforming a coupling member, comprising the steps of:
    forming a concave portion on a coupling face of each member to-be-coupled, each concave portion having planar surfaces inclined to a flowing direction of the coupling member,
    concentrically arranging the first and second members to-be-coupled with their coupling faces directed toward each other and a gap therebetween, a space being formed which comprises the two concave portions and the gap,
    interposing in the space, a coupling member having a smaller deformation resistance than that of the members to-be-coupled, said coupling member being no more than slightly different in height than the height of said space, and
    supporting one end of the coupling member and applying pressure on the other end by using a metal mould to force non-elastical flowing of a part of the coupling member into the concave portions until the flowed part tightly contacts with the inclined planar surfaces by pre-selecting the volume of the coupling member so as to satisfy the relationship:

$$0 \leq S \leq \tfrac{3}{4}b$$

where S is the length of a rubbing face of the members to-be-coupled by the coupling member in the pressure applying direction within the gap and b is the width of the gap in a direction at right angles to the rubbing direction,
    whereby a mechanically strong combination which can transfer a large torque from one member to the other member is created.

2. A coupling process of two members of claim 1, wherein the following extent is preferably satisfied:

$$\tfrac{1}{4}b \leq S \leq \tfrac{1}{2}b.$$

3. A coupling process of two members of claim 1, wherein the inclined angle $\alpha_1$ of the inclined surfaces against the coupling face is respectively made so as to satisfy the following extent:

$$20° \leq \alpha_1 \leq 70°.$$

4. A coupling process of two members of claim 1, 2 or 3, wherein the metal mould has a side surface with the inclined angle $\delta$ to the coupling face in the range as follows:

$$3° \leq \delta \leq 15°.$$

5. The method of claim 4, wherein the pressure applying step is performed with a tapered tip end of the mould that is slightly narrower than said gap, so that the side face is spaced from the coupling faces.

6. A coupling process of two members of claim 1, wherein each concave portion is a trapezoid in section.

7. A coupling process of two members of claim 1, wherein the first member to-be-coupled is a circular plate having a bore or a cylinder and the second member to-be-coupled is a circular plate or a shaft having an outside diameter smaller than the diameter of said bore and the concave portions are spherical grooves.

8. A coupling process of two members of claim 1, wherein the coupling member is made of non-magnetic material.

9. The method of claim 1, wherein the members to-be-coupled are radially supported against deformation thereof during the pressure applying step.

10. The method of claim 1, wherein the coupling member is selected to have a height within 0.2 to 0.3 mm of the height of said space.

11. The method of claim 1, wherein the members to-be-coupled are parts of a clutch rotor.

12. The method of claim 1, wherein the members to-be-coupled are parts of a clutch plate.

13. The method of claim 1, wherein the members to-be-coupled comprise a compressor swashplate and shaft.

14. The method of claim 1, wherein the pressure applying step is performed with any portions of the coupling member extending from the space being radially unsupported.

15. A process of two coupling members in which a first member to-be-coupled and a second member to-be-coupled are coupled by non-elastically deforming a coupling member, comprising the steps of:
forming a concave portion on a coupling face of each member to-be-coupled, each concave portion having planar surfaces inclined to a flowing direction of the coupling member,
concentrically arranging the first and second members to-be-coupled with their coupling faces directed toward each other and a gap therebetween, a space being formed which comprises the two concave portions and the gap,
interposing in the space, a coupling member having a smaller deformation resistance than that of the members to-be-coupled,
providing a member around the members to-be-coupled so as to support against deformation thereof when pressure is applied to the coupling member, and
supporting one end of the coupling member and applying pressure on the other end by using a metal mould to force non-elastical flowing of a part of the coupling member into the concave portions until the flowed part tightly contacts with the inclined planar surfaces by pre-selecting the volume of the coupling member so as to satisfy the relationship:

$$0 \leq S \leq \tfrac{2}{3} b$$

where S is the length of a rubbing face of the members to-be-coupled by the coupling member in the pressure applying direction within the gap and b is the width of the gap in a direction at right angles to the rubbing direction,
whereby a mechanically strong combination which can transfer a large torque from one member to the other member is created.

* * * * *